W. SCHMIDT.
DOWEL CASING FOR FIXING IN CEILINGS AND WALLS.
APPLICATION FILED NOV. 16, 1912.
1,086,861.
Patented Feb. 10, 1914.
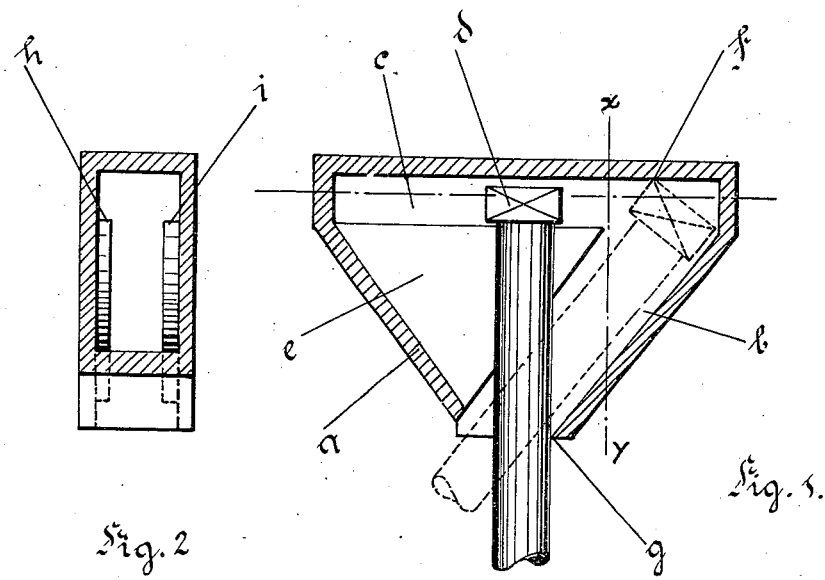
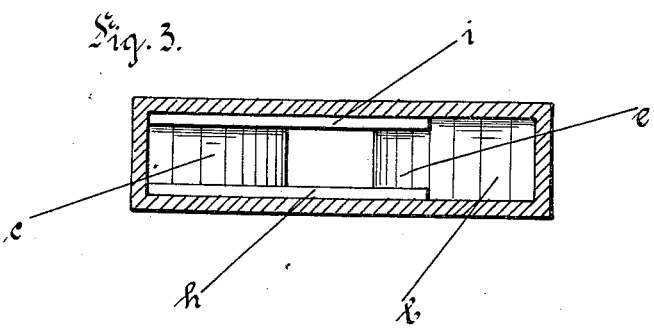

UNITED STATES PATENT OFFICE.

WILLY SCHMIDT, OF FRANKFORT-ON-THE-MAIN, GERMANY.

DOWEL-CASING FOR FIXING IN CEILINGS AND WALLS.

1,086,861. Specification of Letters Patent. Patented Feb. 10, 1914.

Application filed November 16, 1912. Serial No. 731,665.

*To all whom it may concern:*

Be it known that I, WILLY SCHMIDT, citizen of the German Empire, residing at Frankfort-on-the-Main, in the Province of Hesse-Nassau and Kingdom of Prussia, Germany, have invented certain new and useful Improvements in Dowel-Casings for Fixing in Ceilings and Walls; and I do hereby declare the following to be a full, clear, and exact description of the invention, such as will enable others skilled in the art to which it appertains to make and use the same.

Fixing dowels, the screw bolts of which can be introduced from below and which serve for fixing ceiling brackets, shafting and the like are in themselves known. However, in these, abnormal bolts with long heads must be employed which are dear owing to the unusual steps in their manufacture. In these, the head lies in corresponding slots when the bolt is turned sidewise through 90 degrees so that the disadvantage is present that upon attempting to screw up the fastening nut, the bolt is raised and then falls down. However, the bolts which are pushed in sidewise are still more dangerous for upon bearings becoming loose which in the case of large, unbalanced pulls in the belts is not unlikely, the bearing bracket together with the machine parts mounted thereon can fall down and this is a source of great danger to anyone happening to be near. This trouble is completely removed by the invention hereinafter described.

The subject matter of the invention is described in the documents and Figure 1 shows the same in horizontal section. Fig. 2 in vertical section through the place $x$—$y$ and Fig. 3 in plan with the cover removed.

The dowel casing $a$ possesses in order to secure certain advantages a tapering outside shape. In the inside is arranged the ascending passage $b$ sloping sidewise with the maze like continuation passage $c$, the dimensions of which are designed so that the square head $d$ of a screw-bolt of usual form can be inserted. In connection with the passages $b$ and $c$ is a third narrower passage $e$ which is of such a breadth that the stem of the bolt comfortably passes through but the head $d$ does not.

If it is attempted according to Fig. 1 to insert the headed bolt with its head into the dowel casing, it is worked up in the direction of the sloping ascending passage $b$ to the point $f$. If it is desired to bring the bolt to its usual vertical position, the stem of the bolt is pressed against the corner $g$ of the casing and effects a turning about this point so that the head $d$ of the bolt slides into the passage $e$ while the stem takes up its position in the narrower passage $e$. The head of the bolt then rests on the surfaces $h$ and $i$ (Figs. 1 and 2) which are formed by the join of the passages $b$, $c$ with $e$.

The supporting bolt is retained in its vertical position under its own weight alone; this is much more advantageous if a hanger bearing or the like is secured by it.

When under load, neither vertical nor horizontal forces can bring the supporting bolts out of the casing.

Having thus described my invention, what I claim as new and desire to secure by Letters Patent of the United States is:

1. A dowel casing comprising a hollow triangular frame open at its lower apex and providing an aperture for the insertion of a bolt, together with spaced apart abutments on the walls of said frame providing a V shaped channel whereby said bolt may be inserted endwise and then moved sidewise to its resting place on said abutments.

2. A dowel casing comprising a hollow triangular frame open at its lower end, spaced apart abutments providing on the walls of said frame a V shaped channel whereby a bolt may be inserted endwise and then moved sidewise to its resting place on said abutments.

3. A dowel casing comprising a hollow triangular frame open at one end thereof spaced apart, triangular abutments on the inside of said frame adapted to form together with the walls thereof, a V-shaped channel whereby a bolt may be inserted endwise and then moved sidewise to its resting place on said abutments.

In testimony whereof I affix my signature in the presence of two witnesses.

WILLY SCHMIDT.

Witnesses:
FRIEDRICH CARL WENZEL,
MAX HERMANN HÖPPNER.

Copies of this patent may be obtained for five cents each, by addressing the "Commissioner of Patents, Washington, D. C."